United States Patent [19]
Bogdanovic

[11] 3,919,325
[45] Nov. 11, 1975

[54] PROCESS FOR PREPARING ALLYLIDENPHOSPHORANES

[75] Inventor: Borislav Bogdanovic, Mulheim (Ruhr), Germany

[73] Assignee: Studiengesellschaft Kohle mbH, Mulheim (Ruhr), Germany

[22] Filed: Feb. 26, 1973

[21] Appl. No.: 335,986

[30] Foreign Application Priority Data
Mar. 1, 1972  Germany............................ 2209685

[52] U.S. Cl. ... 260/606.5 P; 260/448 A; 260/486 R; 260/526 R; 260/632 R; 260/668 R; 260/677 R; 260/680 R
[51] Int. Cl. .............................................. C07j 9/36
[58] Field of Search ....................... 260/606.5 P

[56] References Cited
UNITED STATES PATENTS

| | | | |
|---|---|---|---|
| 2,912,467 | 11/1959 | Gerecke | 260/606.5 P |
| 3,095,454 | 6/1963 | Marco et al. | 260/606.5 P |
| 3,247,266 | 4/1966 | Speziale et al. | 260/606.5 P |
| 3,304,333 | 2/1967 | Truscheit et al. | 260/606.5 P |
| 3,647,856 | 3/1972 | Josey | 260/606.5 P |
| 3,723,537 | 3/1973 | Buddrus | 260/606.5 P |

*Primary Examiner*—Arthur P. Demers
*Attorney, Agent, or Firm*—Burgess, Dinklage & Sprung

[57] ABSTRACT

Allylidene phosphoranes are prepared by a new process comprising reacting dialkyl aluminum alkylidene amides or bis(N-dialkyl aluminum-imino)alkanes which are obtainable from saturated aliphatic nitriles or dinitriles and dialkyl aluminum hydrides with alkylidene phosphoranes $R^3CH=PR_3^4$. The allylidene phosphoranes are useful as intermediate products in the synthesis of 1,3-dienes which include insect attracting substances and flavoring agents, and in the synthesis of 1,5-dienes such as squalene.

7 Claims, No Drawings

PROCESS FOR PREPARING ALLYLIDENPHOSPHORANES

The present invention relates to a process for the production of allylidene phosphoranes (I) having the formula

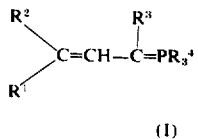

(I)

The conventional processes for producing allylidene phosphoranes involve reacting allyl halides with tertiary phosphines to form the corresponding allyl phosphonium salts (equation 1) and thereafter reacting the latter with organo-metallic compounds, metal amides or metal alcoholates to effect hydrogen halide cleavage (equation 2).

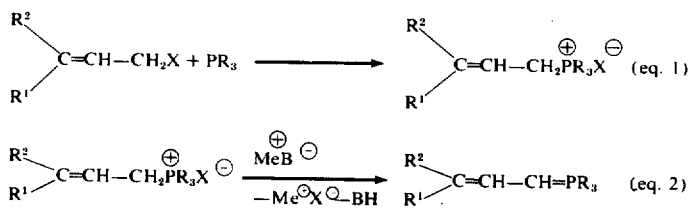

The economy of this process is largely dependent upon the availability of the particular allyl halides.

The higher allyl halides which are required especially in syntheses of natural products must be produced in many cases in expensive multi-stage syntheses.

It has now been found that allylidene phosphoranes having the general formulae (I), (II) or (III)

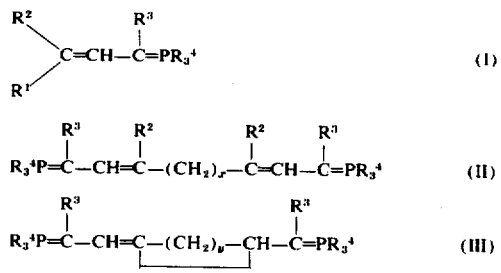

wherein $R^1$ and $R^2$ are hydrogen or same or different alkyl or cycloalkyl groups, $R^3$ is hydrogen or an alkyl group, and $R^4$ is an aryl group which may be substituted, $x$ is a value from 4 to 20 and $y$ is 3 or 4 can be produced substantially more advantageously, i.e. without the preceding production of allyl halides by reacting the dialkylaluminum alkylidene amides (IV) or bis(N-dialkyl aluminum-imino)alkanes obtainable from saturated aliphatic nitriles or dinitriles and dialkyl aluminum hydrides

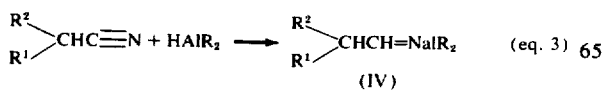

with alkylidene phosphoranes $R^3CH=PR_3^4$. The reaction proceeds according to the following equation:

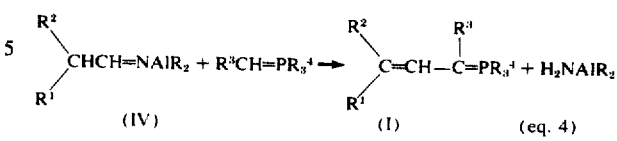

wherein $R^1$ and $R^2$ are hydrogen or same or different alkyl or cycloalkyl groups; $R^3$ is H or alkyl, $R^4$ is aryl. The alkyl groups may, for example, contain from 1 to 20 carbon atoms. The cycloalkyl groups may, for example from 5 to 12 carbon atoms. Allylidene phosphoranes wherein $R^3$ is H and wherein $R^4$ is $C_6H_5$ can be preferably produced by the present process.

Suitable reaction media for carrying out the reaction according to equation 4 include aliphatic and aromatic hydrocarbons, ethers, amines, nitriles, sulfoxides and halohydrocarbons. The preferred reaction temperature ranges between 0° and 20°C. However, the reaction may be carried out at temperatures in a range from −50° to +50°C.

Dialkyl aluminum alkylidene amides may be used both in pure form and in the form of their solutions obtained by reacting nitriles with dialkyl aluminum hydrides or trialkyl aluminum compounds in hydrocarbons for the reaction with, for example, triphenyl phosphine methylene. Triphenyl phosphine methylene both in pure crystalline form (German Pat. No. 1 003 730) and in solution produced in situ may be reacted with dialkyl aluminum alkylidene amides.

The allylidene phosphoranes (I) prepared according to equation 4 may be isolated in pure form or reacted directly in solution with aldehydes or ketones to form conjugated dienes. Particularly suitable for the crystallization of allylidene phosphoranes are ethers and pentane. The removal of dialkyl aluminum amides from the toluene or benzene solutions of allylidene phosphoranes may be effected by adding potassium amide. Dialkyl aluminum amides form low soluble complex salts with potassium amide. These salts have the composition $R_2AlNH_2 \cdot 2KNH_2$ and can be separated by filtration.

It is a particular advantage of the present process that "ylides" (I) of the type $R^1$ = alkyl, $R^2 = R^3 =$ H, $R^4 = C_6H_5$ are formed preferentially, e.g. in a proportion of 70 to 80 %, in the cis-form

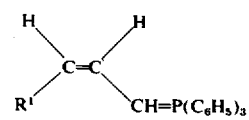

Allylidene phosphoranes are useful as intermediate products in the synthesis of 1,3-dienes according to G. Wittig (cf. Houben-Weyl-Muller, Methoden der organischen Chemie, 4th edition, Vol. V/1c, p. 550). According to E. E. van Tamelen, the 1,5-dienes which are present in natural products, e.g. squalene can also be produced through allylidene phosphoranes (J.Amer. Chem. Soc., 92 (1970) 2139).

Examples of 1,3-dienes which are commercially in demand and have become readily obtainable by the invention include the insect attracting substances hexadeca-10-trans,12 cis-dien-1-ol (Bombykol; cf. A. Butenandt et al, Liebigs Ann. Chem., 658 (1962)65, and tetradeca-3-trans,5-cis-dienoic acid (Megatom acid; cf. I. O. Rodin, M. Leaffer, R. Siverstein, J. Org. Chem., 35 (1970)3152) and flavoring substances such as nona-1-trans,3-cis-dienoic acid ethyl ester (flavoring agent of Williams pear; cf. G. Ohloff, Nachr. Chem. Techn., 19, 447 (1971)).

All of the reactions described in the following examples are carried out in an argon or nitrogen atmosphere because of the sensitivity to air and humidity of the materials used.

EXAMPLE 1

To a solution of 242 g. (3.50 moles) of isobutyronitrile in 0.5 liters of pentane are added dropwise within 4 hours 483 g. (3.40 moles) of diisobutyl aluminum hydride in 0.5 liters of pentane at 10° to 15°C. while stirring. After standing for 12 hours at room temperature, pentane is distilled off and diisobutyl aluminum isobutylidene amide is obtained by distillation under high vacuum (b.p., 105°–110°C./$10^{-4}$ mm.Hg) in pure form as a compound which is crystalline at room temperature. Yield: 637 g. (89% of the theoretical yield).

To a suspension of 6.7 g. (24 mmoles) of triphenyl phosphine methylene in 50 ml. of pentane is added dropwise at room temperature a solution of 5.0 g. (24 mmoles) of diisobutyl aluminum isobutylidene amide in 30 ml. of pentane. After stirring for 2 hours, the initially yellow suspension turns dark red. It is stirred for further 12 hours, and the deep red crystalline precipitate formed after this time is collected on a frit, washed with pentane and thereafter dried under vacuum (0.1 to 0.2 mm. Hg) to give 6.4 g. (81% of the theory) of triphenylphosphine-3-methyl-buten-2-ylidene which is identical with respect to the IR and $^1$H-NMR spectra with the compound prepared by the method of G. Wittig and H. Pommer (German Pat. No. 1,003,730).

EXAMPLE 2

To a solution of 27.3 g. (0.13 moles) of diisobutyl aluminum isobutylidene amide in 260 ml of toluene is added dropwise at room temperature within 2 hours a solution of 32.5 g. (0.12 moles) of triphenyl phosphine methylene in 200 ml. of toluene. The solution obtained is then allowed to stand for 12 hours at room temperature. There are obtained 475 ml of a dark red toluene solution of triphenyl phosphine-3-methyl-buten-(2)-ylidene and diisobutyl aluminum amide. To demonstrate the formation of the "ylide", 3.8 g. (35.8 moles) of benzaldehyde are added dropwise at 0°C. to 100 ml of this solution thereby decolorizing the solution. The organoaluminum compound is decomposed by carefully adding 10 ml. of water and 100 ml of 2N $H_2SO_4$ at 0°C.. The organic layer is separated and the aqueous layer is extracted with 30 ml of ether. The combined extracts are successively shaken with sodium bicarbonate and sodium bisulfite solutions and water and dried over sodium sulfate. Evaporation of the solvents (at 20°C. and 12 mm. Hg) and distillation under high vacuum gives 1.80 g. (45% of the theory, based on triphenyl phosphine methylene) of 1-phenyl-4-methylpentadiene-(1,3) which consists of 69.5% of the cis-isomer and 30.5% of the trans-isomer.

To separate diisobutyl aluminum amide, 5.5 g. (0,1 moles) of potassium amid are added to 200 ml of the above-mentioned toluene solution of triphenyl phosphine-3-methylbuten-(2)-ylidene and diisobutyl aluminum amide. In doing so, slight evolution of heat can be observed. The mixture is stirred for 12 hours whereupon the solution is separated from the precipitated diisobutyl aluminum amide-potassium amide complex by filtration through a G-3 frit.

The ylide solution which contains only traces of aluminum is mixed with benzaldehyde as described above. Processing in the manner described above gives 1-phenyl-4-methylpentadiene-(1,3) (63% cis and 37% trans) in a yield of 46% of the theory (based on triphenyl phosphine methylene).

EXAMPLE 3

Analogously to Example 1, 213 g. (1.50 moles) of diisobutylaluminum hydride and 83 g. (1.51 moles) of propionitrile in 0.5 liters of pentane give 260 g. (88% of the theory) of diisobutyl aluminum propylidene amide which is a colorless liquid having a boiling point of 116°–119°C./$10^{-4}$ mm. Hg.

To a suspension of 13.5 g. (49 mmoles) of triphenyl phosphine methylene in 100 ml of ether is added dropwise at 20°C. with stirring a solution of 10.0 g. (51 mmoles) of diisobutyl aluminum propylidene amide in 50 ml. of ether. The deep red solution is then allowed to stand for 2 hours at 20°C. Thereafter the solution is allowed to stand for 2 days at −78°C. The triphenyl phosphine crotylidene crystallized after this time is freed from solvent by means of an immersion frit, washed with 10 ml of ether at −78°C., and dried under vacuum (0.2 to 0.3 mm. Hg). The yield of pure triphenyl phosphine crotylidene having a cis content of 70 to 75% (according to the $^1$H-NMR spectrum) is 45 to 50% of the theory.

EXAMPLE 4

Analogously to Example 1, 206 g. (1.45 moles) of diisobutyl aluminum hydride and 100 g. (1.45 moles) of n-butyronitrile in 1 liter of pentane give 278 g. (91% of the theory) of diisobutyl aluminum butylidene amide which is a colorless liquid having a boiling point of 120° to 130°C/$10^{-4}$ mm. Hg.

When following the procedure of Example 3 with diisobutyl aluminum butylidene amide and triphenyl phosphine methylene in ether and subsequently crystallizing at −78°C., there is obtained triphenyl phosphine penten-2-ylidene (yield, 55% of the theory) which, according to the $^1$H-NMR spectrum, consists of 72% cis- and 28% trans-triphenyl phosphine penten-2-ylidene.

EXAMPLE 5

Analogously to Example 1, 58.5 g. (0.41 moles) of diisobutyl aluminum hydride and 40.0 G. (0.41 moles) of n-capronitrile in 250 ml of pentane give 92.5 g (94% of the theory) of diisobutyl aluminum hexylidene amide which is obtained in the form of a slightly yellowish liquid having a boiling point of 130° to 139°C./10⁻⁴ mm. Hg.

When following the procedure of Example 3 with diisobutyl aluminum hexylidene amide and triphenyl phosphine methylene in ether and subsequently crystallizing at −78°C., triphenyl phosphine hepten-2-ylidene having a cis-content of 87% (determined by the Wittig reaction) is obtained in a yield of about 50% of the theory.

EXAMPLES 6 to 10

Analogously to Example 3, the following further triphenyl phosphine allylidenes

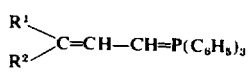

can be prepared from diisobutyl aluminum alkylidene amides

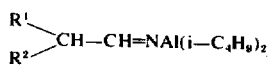

and triphenyl phosphine methylene:

| Example | R¹ | R² | R¹(R²)C=CH—CH=P(C₆H₅)₃ % yeild |
|---|---|---|---|
| 6 | C₂H₅ | CH₃ | 40 – 50 |
| 7 | n—C₃H₇ | H | 40 – 50 |
| 8 | n—C₆H₁₃ | H | 55 – 65 |
| 9 | n—C₇H₁₅ | H | 55 – 65 |
| 10 | n—C₈H₁₇ | H | 55 – 65 |

EXAMPLE 11

To a suspension of 12 g. (42 mmoles) of triphenyl phosphine ethylidene in 90 ml of ether is added at room temperature a solution of 4.5 g. (21 mmoles) of diisobutyl aluminum isobutylidene amide in 90 ml ether and the mixture is allowed to stand at room temperature. After 15 days, one fourth of the resultant deep red solution is mixed with 1.8 ml of benzaldehyde thereby decolorizing the solution. Further treatment in the manner described in Example 2 gives a mixture of the stereoisomeric 1-phenyl-2,4-dimethyl-1,3 pentadienes
(CH₃)₂C=CH-C-(CH₃)=CHC₆H₅,
which demonstrates the formation of triphenyl phosphine allylidene

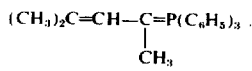

EXAMPLE 12

To a solution of 14.2 g. (100 mmoles) of diisobutyl aluminum hydride in 0.4 liters of pentane are added dropwise at 10° to 15°C. 6.8 g. (50 mmoles) of suberonitrile within 1 hour. A voluminous colorless precipitate is formed. The suspension is allowed to stand for 2 hours at room temperature and is then added with stirring to a suspension of 27.6 g. (100 mmoles) of triphenyl phosphine methylene in 0.1 liters of ether. This results in dissolution of triphenyl phosphine methylene and the organoaluminum compound and gradual precipitation of the bisylide

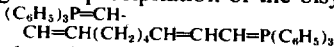

from the solution in the form of a red precipitate. After stirring for 12 hours at 20°C., the bisylide is collected on a G3 frit, washed with pentane and dried under vacuum (0.2 to 0.3 mm. Hg). Yield, 28 g. (85% of the theory).

EXAMPLE 13

By the procedure of Example 12, 8.2 g. (50 mmoles) of sebaconitrile [NC(CH₂)₈CN] are reacted with 14.2 g. (100 mmoles) of diisobutyl aluminum hydride in 0.4 liters of pentane and the resultant 1,10-bis(N-diisobutyl-aluminylimino)decane is reacted with 27.6 g. (100 mmoles) of triphenyl phosphine methylene in 0.1 liters of ether to give the bisylide

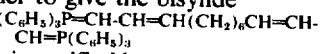

which is purified by recrystallization in ether. Yield, 70 to 80% of the theory.

EXAMPLE 14

By the procedure of Example 12, 15.0 g. (100 mmoles) of azelaonitrile [NC(CH₂)₇CN] are reacted with 28.4 g. (200 mmoles) of diisobutyl aluminum hydride in 0.4 liters of pentane and the resultant 1,9-bis(N-diisobutyl-aluminyl-imino)-nonane is reacted with 55 g. (200 mmoles) of triphenyl phosphine methylene in 0.1 liters of ether to give 0.5 liters of a deep red ether-pentane solution of the bisylide

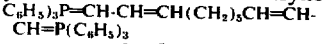

To demonstrate the formation of the bisylide, one half of this solution is mixed with 4.4 g. (100 mmoles) of acetaldehyde. Processing as described in Example 2 gives a mixture of the stereoisomeric pentadeca-2,4,11,13-tetraenes.

EXAMPLE 15

To a suspension of 3.0 g. (75 mmoles) of tri(m-tolyl)-methyl phosphonium bromide in 25 ml of ether are added at 0°C. 5 ml. of a 1.5N n-butyl lithium solution in hexane and thereafter at room temperature 1.5 g. (76 mmoles) of diisobutyl aluminum propylidene amide. To demonstrate the formation of the tri(m-tolyl)phosphine crotylidene, the deep red solution is mixed after 4 hours with 0.8 g. of benzaldehyde thereby decolorizing the solution. Processing as described in Example 2 gives a mixture of the stereoisomers of 1-phenyl-penta-1,3-diene.

EXAMPLE 16

To a solution of 28.4 g. (0.2 moles) of diisobutyl aluminum hydride in 600 ml. of pentane were added dropwise at +10° to +15°C. with stirring within 30 minutes 10.8 g. (0.1 moles) of adipodinitrile [NC(CH₂)₄CN]. Stirring is continued for 2 hours at 25°C. and then a suspension of 55.2 g. (0.2 moles) of triphenyl phosphine methylene in 200 ml of ether is added to the viscous solution of the 1,6-di(N-diisobutyl-aluminumimino)hexane whereafter the suspension is stirred for 15 hours at 25°C. The deep red bis-ylide (V) precipitated after this time was recovered in pure form by filtration, washing with ether or pentane and drying under vacuum. Yield, 33.1 g. (52.5% of the theory).

form the bis-ylide (VII). The compound (VII) contained in the solution was characterized by the Wittig reaction with acetaldehyde to form the cyclohexane derivative (VIII).

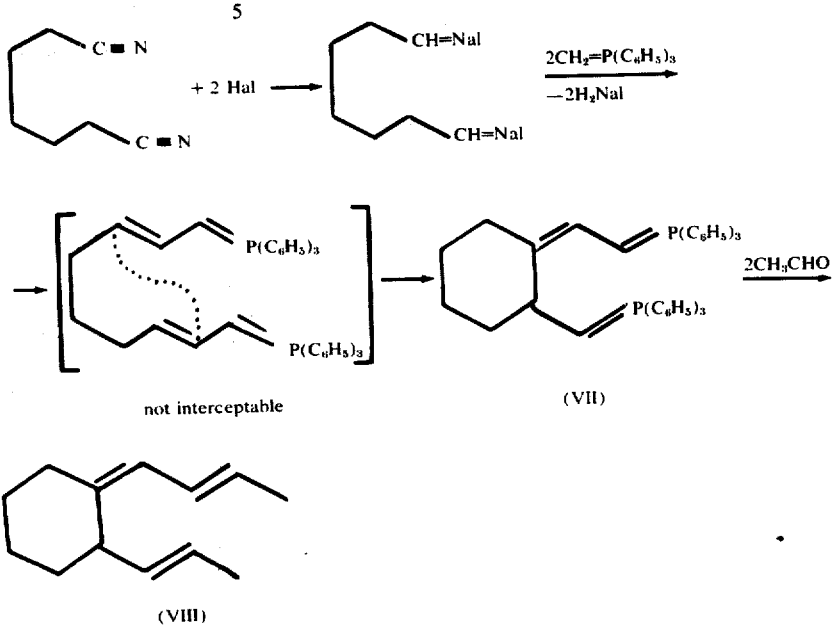

The structure of the bis-ylide (V) was confirmed by its $^1$H-NMR spectrum and by the Wittig reaction with acetaldehyde giving the cyclopentane derivative (VI).

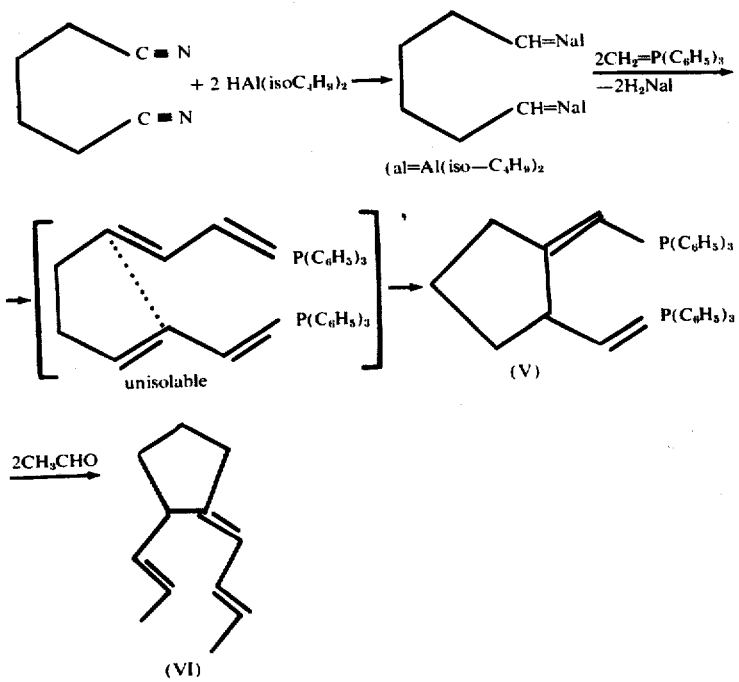

EXAMPLE 17

Analogously to the above example 16, 14.2 g (0.1 moles) of diisobutyl aluminum hydride were allowed to react with 6.1 g. (50 mmoles) of heptane dinitrile [NC(CH$_2$)$_5$NC] in 200 ml of pentane and the resultant solution of 1,7-bis(N-diisobutyl aluminum imino)-heptane was subsequently reacted with 27.6 g. (0.1 moles) of triphenyl phosphine methylene in 100 ml of ether to

What is claimed is:
1. A process for preparing an allylidene phosphorane of the formula (I), (II) or (III)

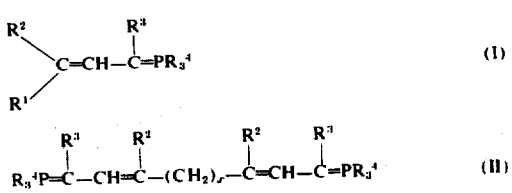

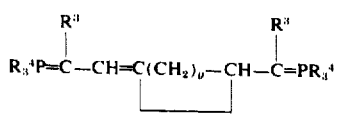
(III)

wherein $R^1$ and $R^2$ is each hydrogen or like or different alkyl of 1–20 carbon atoms or cycloalkyl groups of 5–12 carbon atoms, $R^3$ is hydrogen or alkyl of 1–20 carbon atoms, and $R^4$ is phenyl or tolyl, $x$ is a value from 4 to 20, and $y$ is 3 or 4, which comprises reacting the dialkyl aluminum alkylidene amide or bis (N-dialkyl aluminum-imino) alkane obtainable from saturated aliphatic nitrile or dinitrile and dialkyl aluminum hydride, with an alkylidene phosphorane $R^3CH=PR_3^4$.

2. The process of claim 1, wherein dialkyl aluminum alkylidene amide of the type

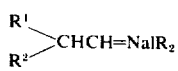

is reacted with triphenyl phosphine methylene $CH_2=P(C_6H_5)_3$.

3. The process of claim 1, wherein a member selected from the group consisting of aliphatic and aromatic hydrocarbons, ethers, amines, nitriles, sulfoxides and halohydrocarbons is used as solvent.

4. The process of claim 1, wherein said reaction is carried out at a temperature within the range from −50°C. to +50°C.

5. The process of claim 4, wherein said reaction is carried out at a temperature within the range from 0°C. to 20°C.

6. The process of claim 1, wherein when preparing triphenyl phosphinallydene of the type $R^1$ = alkyl, $R^2$ = $R_3$ = H, $R^4$ = $C_6H_5$, the cis-isomer

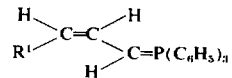

is preferentially formed.

7. The process of claim 1, wherein a phosphorane of formula (II) or (III) is produced by reacting the corresponding bis(N-dialkyl aluminum-imino) alkane with triphenyl phosphine methylene $CH_2 = P(C_6H_5)_3$.

* * * * *